United States Patent
Lee (12) 
(10) Patent No.: US 6,389,001 B1
(45) Date of Patent: May 14, 2002

(54) METHOD FOR DOWNLOADING DATA TO ADD FUNCTIONS TO VOCODER

(75) Inventor: Ug-gi Lee, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/196,061

(22) Filed: Nov. 19, 1998

(30) Foreign Application Priority Data

Nov. 20, 1997 (KR) .............................. 97-61319

(51) Int. Cl.[7] .............................................. G06F 13/00
(52) U.S. Cl. .......................... 370/342; 370/335; 717/11
(58) Field of Search ................................. 370/320, 335, 370/342, 441; 709/220, 221, 222; 717/11; 711/3

(56) References Cited

U.S. PATENT DOCUMENTS

| | | | |
|---|---|---|---|
| 4,933,936 A | | 6/1990 | Rasmussen et al. |
| 5,515,375 A | | 5/1996 | DeClerck |
| 5,604,905 A | | 2/1997 | Tevanian et al. |
| 5,630,139 A | | 5/1997 | Ozaki |
| 5,724,610 A | * | 3/1998 | Han et al. .................. 370/332 |
| 5,794,049 A | | 8/1998 | Lindholm |
| 5,978,589 A | * | 11/1999 | Yoon ......................... 455/514 |
| 6,074,435 A | * | 6/2000 | Rojestal ..................... 717/11 |
| 6,128,776 A | * | 10/2000 | Kang ......................... 717/11 |

* cited by examiner

Primary Examiner—Wellington Chin
Assistant Examiner—Frank Duong
(74) Attorney, Agent, or Firm—Dilworth & Barrese, LLP (57) ABSTRACT

A method is provided for downloading data to add enhanced variable rate code (EVRC) functions to a vocoder in a base station controller (BSC) of a code division multiple access (CDMA) cellular system. The BSC includes a plurality of voice digital signaling processors (VDSPs), a call control digital signaling processor (CDSP), a selector and vocoder processor (SVP) and a selector interface processor (SIP). The BSC connects a base station transceiver subsystem (BTS) and a mobile switching center (MSC). Each of the plurality of VDSPs respectively control each of a plurality of vocoders for compressing a voice. The CDSP controls the plurality of VDSPs, the SVP controls the CDSP, and the SIP controls the SVP. The method includes the steps of: dividing a specific memory area into a code part and a data part for storing code and data, respectively; requesting the SIP to download an executable program and the code stored in the code part by BOOT of the SVP; loading the executable program and the code stored in the code part to the SVP by a processor loader execution (PLX) of the SIP; running the loaded executable program by the SVP; requesting the PLX of the SIP to load the data stored in the data part by the executable program; and loading the data stored in the data part directly to a memory of the CDSP so as to bypass a memory of the SVP.

10 Claims, 6 Drawing Sheets

METHOD FOR DOWNLOADING DATA TO ADD FUNCTIONS TO VOCODER

FIELD OF THE INVENTION

The present invention relates to vocoders and, more particularly, to a method for downloading data to add functions to a vocoder.

DESCRIPTION OF THE RELATED ART

The conventional art in this field is disclosed in U.S. Pat. No. 5,515,375. In a conventional cellular mobile telephone system, voice is detected through a microphone and coded by a vocoder. The vocoder supplies the representative coded voice data for a specific voice. The microphone can detect the corresponding voice by searching a codebook using the received code.

Figure 1:
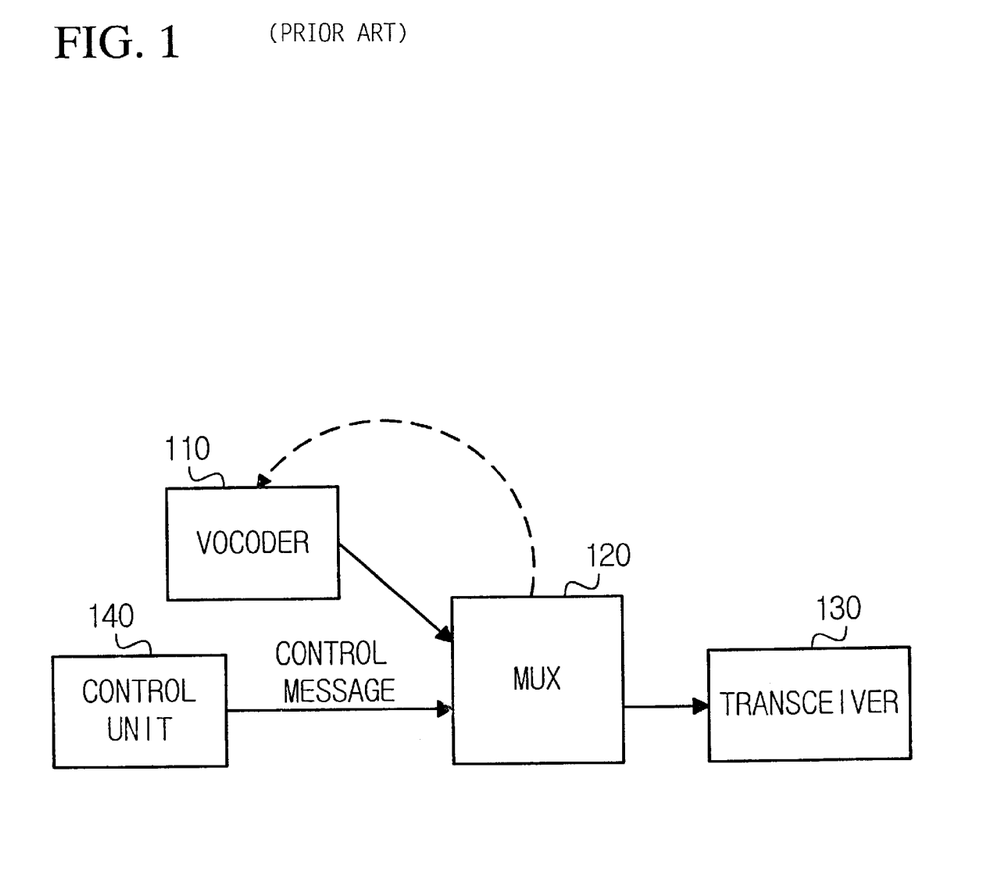
FIG. 1 is a block diagram illustrating voice coding and multiplexing according to the prior art.

FIG. 1 is a block diagram illustrating voice coding and multiplexing as disclosed in U.S. Pat. No. 5,515,375. A signal coded by a vocoder 110 is transmitted to a multiplexer (MUX) 120. The multiplexer 120 is controlled by a control message transmitted from a control unit 140. The multiplexer 120 transmits the multiplexed code signal to a transceiver 130 and the transceiver 130 transmits the multiplexed code signal.

Moreover, a conventional program download type information processor is disclosed in U.S. Pat. No. 5,630,139. In general, an information processor includes the following: a central processing unit (CPU); an Electrically Erasable and Programmable Read Only Memory (EEPROM) for storing programs for ordinary processing and program download control; and a random access memory (RAM) having a first program storage area for loading the programs stored in the EEPROM and a second program storage area for storing a new downloaded program. During an idle time in the ordinary processing program, the CPU executes a download control program to download a new program from an external device into the second program storage area of the RAM and to store the downloaded program in the EEPROM. The CPU is reset after storage of the program. However, U.S. Pat. No. 5,630,139 does not separate the software (S/W) block (i.e., the new program) into CODE and DATA.

In general, an IS-95 code division multiple access (CDMA) system includes a plurality of mobile stations (MSs), a plurality of base station transceiver subsystems (BTSs), a plurality of base station controllers (BSCs) for controlling the plurality of base station transceiver subsystems, a plurality of base station managers (BSMs) for maintaining the plurality of base station controllers, a plurality of mobile switching centers (MSCs) for connecting the plurality of base station transceiver subsystems to a public switched telephone network (PSTN), and a plurality of home location registers (HLRs) connected to the plurality of mobile switching centers for managing the status of services for the plurality of mobile stations.

In a CDMA system as described above, a vocoder is employed in a base station controller (BSC). The multiplexed signal is transmitted to a base station transceiver subsystem (BTS) and then to a mobile telephone. In a vocoder system that operates as described above, an enhanced variable rate code (EVRC) function may be used to provide subscribers with better quality voice service.

Figure 2:
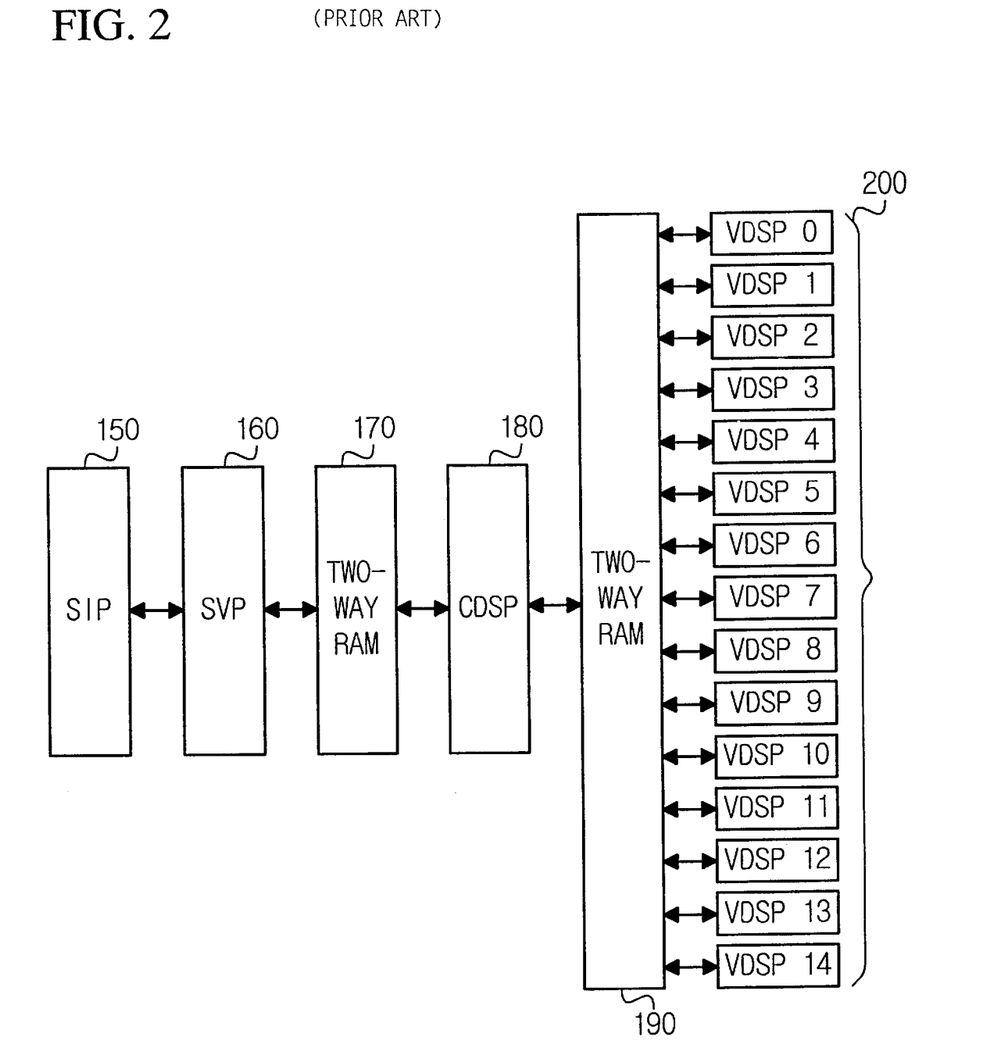
FIG. 2 is a diagram illustrating the structure of a vocoder control processor in a base station controller (BSC) according to the prior art.

A processor utilized in a base station controller (BSC) for operation and maintenance is referred to as a selector and vocoder processor (SVP). FIG. 2 is a diagram illustrating the structure of a vocoder control processor in a BSC according to the prior art. A selector and vocoder processor (SVP) 160 is connected to a selector interface processor (SIP) 150. The SVP 160 communicates with a call control digital signaling processor (CDSP) 180 using a dual port RAM 170. The CDSP 180 communicates with a plurality of voice digital signaling processors (VDSPs) 200 using another dual port RAM 190.

Each of the plurality of VDSPs 200 is a practical vocoder control processor that controls a respective vocoder. Prior to the addition of the EVRC function, some of the S/Ws that were operated in the SVP included, for example: a real-time operating system (RMOS_SVP); a transcoding selector bank controller execution (TCOX) block for performing call control processing; an SVP maintenance management execution (SMNX) block for performing status management and testing of the vocoders; and a call control digital signaling processor execution (CDSPX) block for performing management of digital signaling processors (DSPs) and message processing.

As stated above, a conventional SVP has an operating system and three application blocks. Upon initially starting, SVP 160 receives packets from a processor loader execution (PLX) block using a booter. The PLX is a program loader of SIP 150 which is an upper processor in relation to SVP 160. Then, RMOS_SVP, TCOX, SMNX and CDSPX are respectively loaded to a corresponding memory area of SVP 160.

Figure 3:
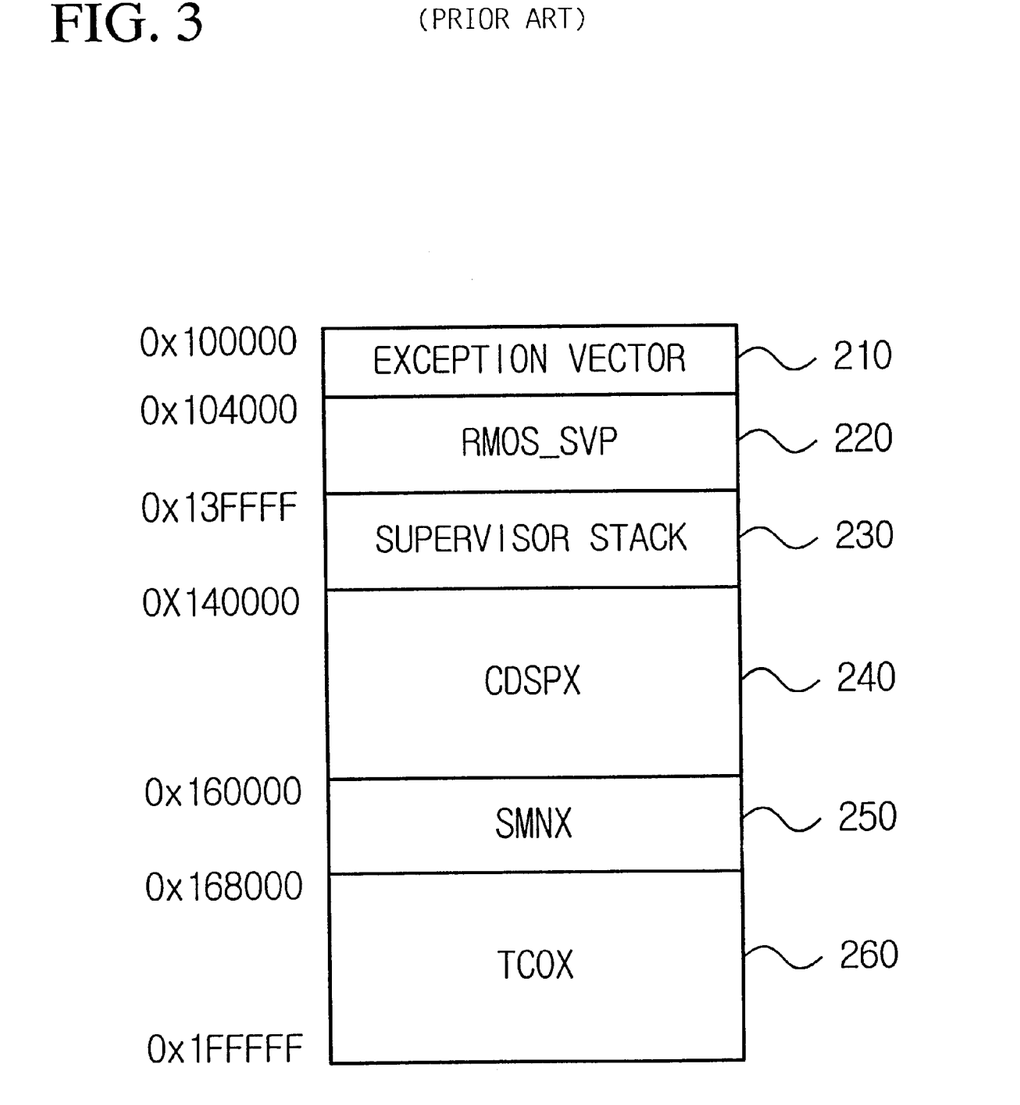
FIG. 3 is a diagram of a memory map of a memory for a selector and vocoder processor (SVP) according to the prior art.

FIG. 3 is a diagram of a memory map of a memory for a selector and vocoder processor (SVP) according to the prior art. The memory is composed of the following six blocks: an exception vector 210, an RMOS_SVP 220, a supervisor stack 230, a CDSPX 240, an SMNX 250 and a TCOX 260. The six blocks are located at a 1 Megabyte area of static random-access memory (SRAM) from address 100000 to address 1FFFFF.

The interior structure of CDSPX 240 is divided into a code part and a data part. The code part performs interfacing with 15 VDSPs, downloading of binary data (executable data), processing of VDSP messages, various kinds of statistics, reporting status management, etc. The data part of CDSPX 240, which includes binary data (executable data), is not used by SVP 160. Instead, the data is downloaded to CDSP/VDSP for use thereby.

The EVRC function is implemented within TCOX 260, which is a call control-processing block in a vocoder providing voice services. Utilizing the EVRC function, it is possible to support 8 k and 13 k QCELP vocoding.

In general, if a function is newly added and, accordingly, the size of the corresponding application block is increased, the corresponding processor should be able to accommodate the corresponding application block using the processor's limited memory resources. That is, if an EVRC function is added to a vocoder having the above structure, then the memory area of the corresponding application block (i.e., TCOX) should be increased. However, the conventional processor associated with the vocoder in the BSC has insufficient memory resources to accommodate the required increase of memory area.

Since the problem is a lack of memory, the problem may be solved by simply supplementing the memory size with additional hardware. However, since the SVPs (and their associated memory) are provided on selector transcode assembly (SXOA) boards, all the SXOA boards presently employed in a CDMA system would need to be replaced. Disadvantageously, the above replacement would result in significant pecuniary loss. Therefore, it would be desirable to support EVRC service using a S/W method that allows the existing hardware (H/W) configuration to remain unchanged.

SUMMARY OF THE INVENTION

A method is provided for downloading data to add enhanced variable rate code (EVRC) functions to a vocoder in a base station controller (BSC) of a code division multiple access (CDMA) cellular system. The BSC includes a plurality of voice digital signaling processors (VDSPs), a call control digital signaling processor (CDSP), a selector and vocoder processor (SVP) and a selector interface processor (SIP). The BSC connects a base station transceiver subsystem (BTS) and a mobile switching center (MSC). Each of the plurality of VDSPs respectively control each of a plurality of vocoders for compressing a voice. The CDSP controls the plurality of VDSPs, the SVP controls the CDSP, and the SIP controls the SVP. The method includes the steps of: dividing a specific memory area into a code part and a data part for storing code and data, respectively; requesting the SIP to download an executable program and the code stored in the code part by BOOT of the SVP; loading the executable program and the code stored in the code part to the SVP by a processor loader execution (PLX) of the SIP; running the loaded executable program by the SVP; requesting the PLX of the SIP to load the data stored in the data part by the executable program; and loading the data stored in the data part directly to a memory of the CDSP so as to bypass a memory of the SVP.

These and other objects, features and advantages of the present invention will become apparent from the following detailed description of illustrative embodiments thereof, which is to be read in connection with the accompanying drawings, where the same reference numerals are used to represent the same functional elements.

DESCRIPTION OF PREFERRED EMBODIMENTS

Figure 4:
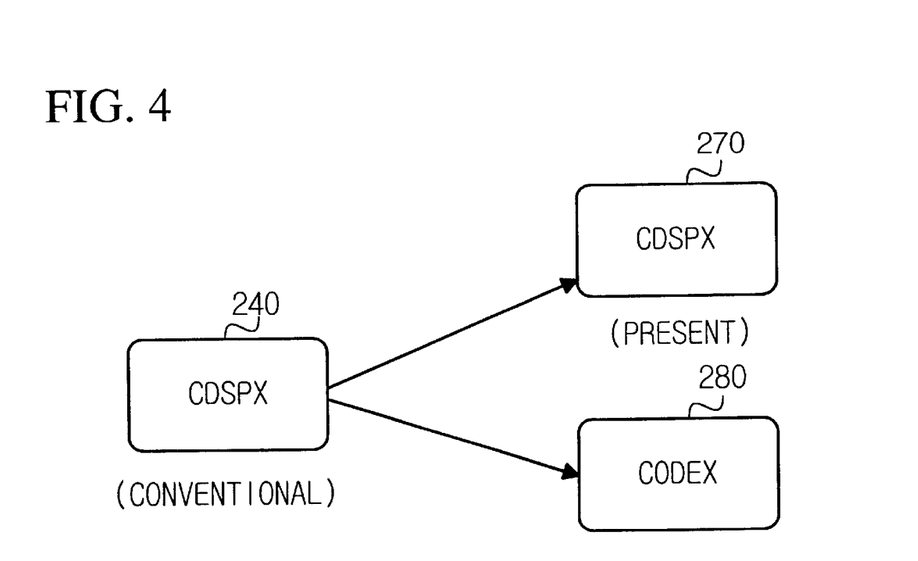
FIG. 4 is a diagram illustrating a configuration according to the present invention for separating a conventional Call Control Digital Signaling Processor Execution (CDSPX) software (S/W) block.

FIG. 4 is a diagram illustrating a configuration according to the present invention for separating a conventional Call Control Digital Signaling Processor Execution (CDSPX) software (S/W) block. The conventional CDSPX 240 is separated or divided into a CDSPX 270 and a Code Execution (CODEX) 280 in order to solve the problem of a lack of memory in a Selector and Vocoder Processor (SVP) 160 when using an Enhanced Variable Rate Code (EVRC) service. The CDSPX 240, which is separated as stated above, is respectively loaded to memory areas of SVP 160 and a Call Control Digital Signaling Processor (CDSP) 180 according to the requests of lower processors.

Figure 5:
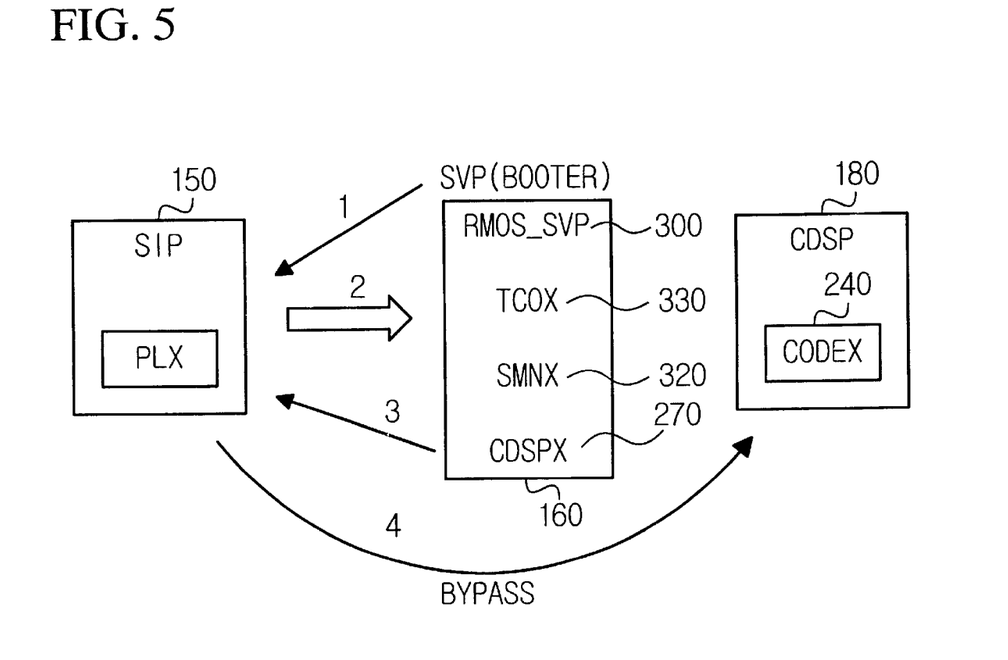
FIG. 5 is a flowchart of a method for data loading according to the present invention.

FIG. 5 is a flowchart of a method for data loading according to the present invention. When SVP 160 is started, a booter of SVP 160 requests a data loading from a selector interface processor (SIP) 150 (step 501). The SIP 150 performs sequential loading of the following blocks to SVP 160 (step 502): a real-time operating system (RMOS_SVP) 300; a Transcoding Selector Bank Controller Execution (TCOX) 330; a SVP Maintenance Execution (SMNX) 320; and CDSPX 270. When the RMOS_SVP 300 executes all S/W blocks, a call control digital signaling processor (CDSP) 180 in SVP 160 requests a download of CODEX 240 from SIP 150 (step 503). The SIP 150 performs loading of CODEX 240 to CDSP 180, bypassing SVP 160 (step 504). Through the aforementioned steps, SVP 160 can secure a memory area necessary for EVRC service.

A processor loader execution (PLX) block, which is a S/W block that is loaded in SIP 150 and a BCP (Base station transceiver Subsystem control processor), performs loading of corresponding application blocks to lower processors. The loading scheme between SIP 150 and SVP 160 in consideration of the addition of the EVRC function will now be described.

Initially, in order to secure memory, the conventional CDSPX 240 has been divided into CDSPX 270 (the existing code part having added thereto a function of loading to the CDSP) and CODEX 280 (the binary data part being downloaded to the CDSP). When a load is requested from the booter of SVP 160, PLX of SIP 150 performs loading of RMOS_SVP 300, TCOX 330, SMNX 320 and CDSPX 270 to SVP 160. Then, RMOS_SVP 300 is executed and the RMOS_SVP 300 executes each application block. At this time, the CDSPX 270 executed by RMOS_SVP 300 directly performs a loading of CODEX 280 from PLX of SIP 140 to CDSP 180 (and not to SVP 160) using the added loading function.

The changed loading scheme between SIP 150 and SVP 160 will now be described. The loading function of CDSPX uses the loading function performed by the booter. When PLX receives a loading request from a lower processor, the PLX confirms the address of the requesting lower processor, and determines the processor type of the requesting lower processor. Then, the PLX sequentially counts the number of blocks having the same processor type as the requesting processor in the existing block table of the PLX, and downloads the counted result to the lower processors. The lower processors sequentially request the loading of S/W blocks from the block of 0 (zero) to the block corresponding to the counted result minus 1, and then receive the blocks.

In the present invention, if the processor requesting loading is SVP 160, the PLX performs a subtraction operation such as subtracting a value of 1 from the counted result (i.e., the result of counting the number of blocks having same processor type as the processor requesting the download). Then, the PLX performs the loading of S/W blocks to SVP 160 from the block of 0 (zero) to the block corresponding to the counted result minus 1.

The S/W blocks having their processor type as SVP 160 are RMOS_SVP 300, TCOX 330, SMNX 320, CDSPX 270 and CODEX 280. However, the loading is performed in accordance with the value of the counted result minus 1, so only four blocks (i.e., except for CODEX 270) are loaded to SVP 160. That is, the booter of SVP 160, being loaded with a value of 4 corresponding to the number of processors having the same processor type as the requesting processor (i.e., 5) minus 1, sequentially receives block 0 (RMOS_SVP), block 1 (TCOX), block 2 (SMNX) and block 3 (CDSPX) using a loading sequence of 0, 1, 2, and 3. Subsequently, if CDSPX 270 starts and requests a load to PLX of SIP 150, the PLX similarly downloads the value of 4 as the value of counting for the number of blocks having same type with the type of the processor. The CDSPX 270, upon receiving the value of 4, directly loads only block 4 (i.e., CODEX) using a loading sequence of 4 differently than the booter of SIP 150. Through the above described steps, CODEX 270 is directly bypassed to CDSP 180 (and not to SVP 160) so that SVP 160 can secure a memory area for the EVRC function.

Figure 6:
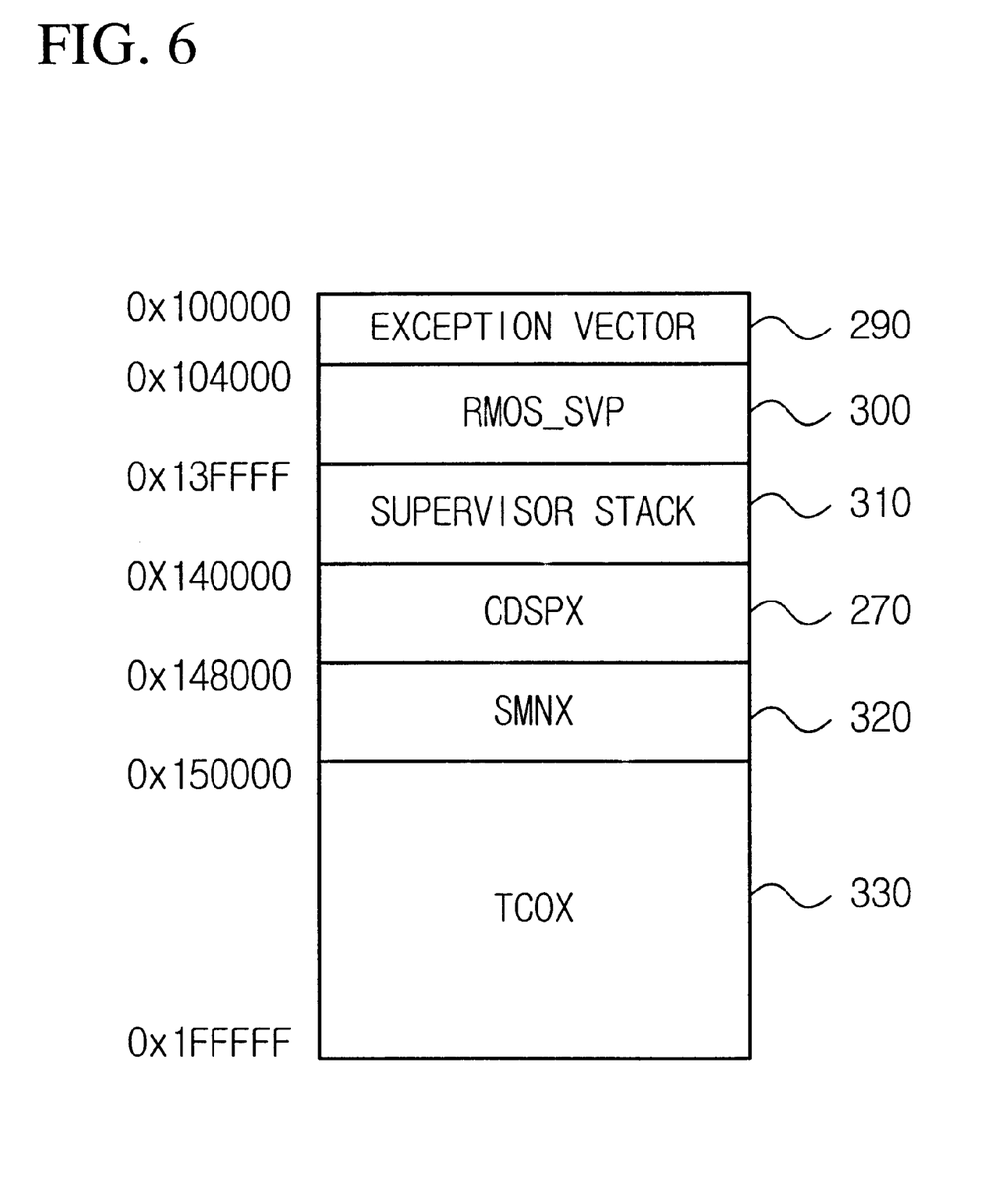
FIG. 6 is a diagram of a memory map of a memory for a selector and vocoder processor (SVP) according to the present invention.

FIG. 6 is a diagram of a memory map of a memory for a selector and vocoder processor (SVP) according to the present invention. That is, the memory in SVP 160 is composed of the following six blocks: an exception vector 290, an RMOS_SVP 300, a supervisor stack 310, a CDSPX 270, an SMNX 320 and a TCOX 330. Only a part of code, CDSPX 270 is loaded to the memory of SVP and a part of data, CODEX 280, such that it has a large area, is directly loaded to the CDSP 180. As a result, CDSPX 270 uses a memory area which is smaller than that conventionally employed. Therefore, the remaining part is used by TCOX 330 for the EVRC service.

Table 1 illustrates the changes in the memory resources of application block SVP 160. The memory area of CDSPX 270 is decreased 96 KB (i.e., from 128 KB before adding the EVRC function to 32 KB after adding the EVRC function). The remaining area previously used by CDSPX 270 is now used by TCOX 330 which provides the EVRC service. Thus, the memory area of TCOX 330 is increased from 608 KB to 704 KB.

TABLE 1

| Block | Before adding | After adding | Increased area |
| --- | --- | --- | --- |
| RMOS_SVP | 256k | 256k | — |
| CDSPX | 128k | 32k | −96k |
| SMNX | 32k | 32k | — |
| TCOX | 608k | 704k | +96k |
| Total | 1024k | 1024k | — |

Figure 7:
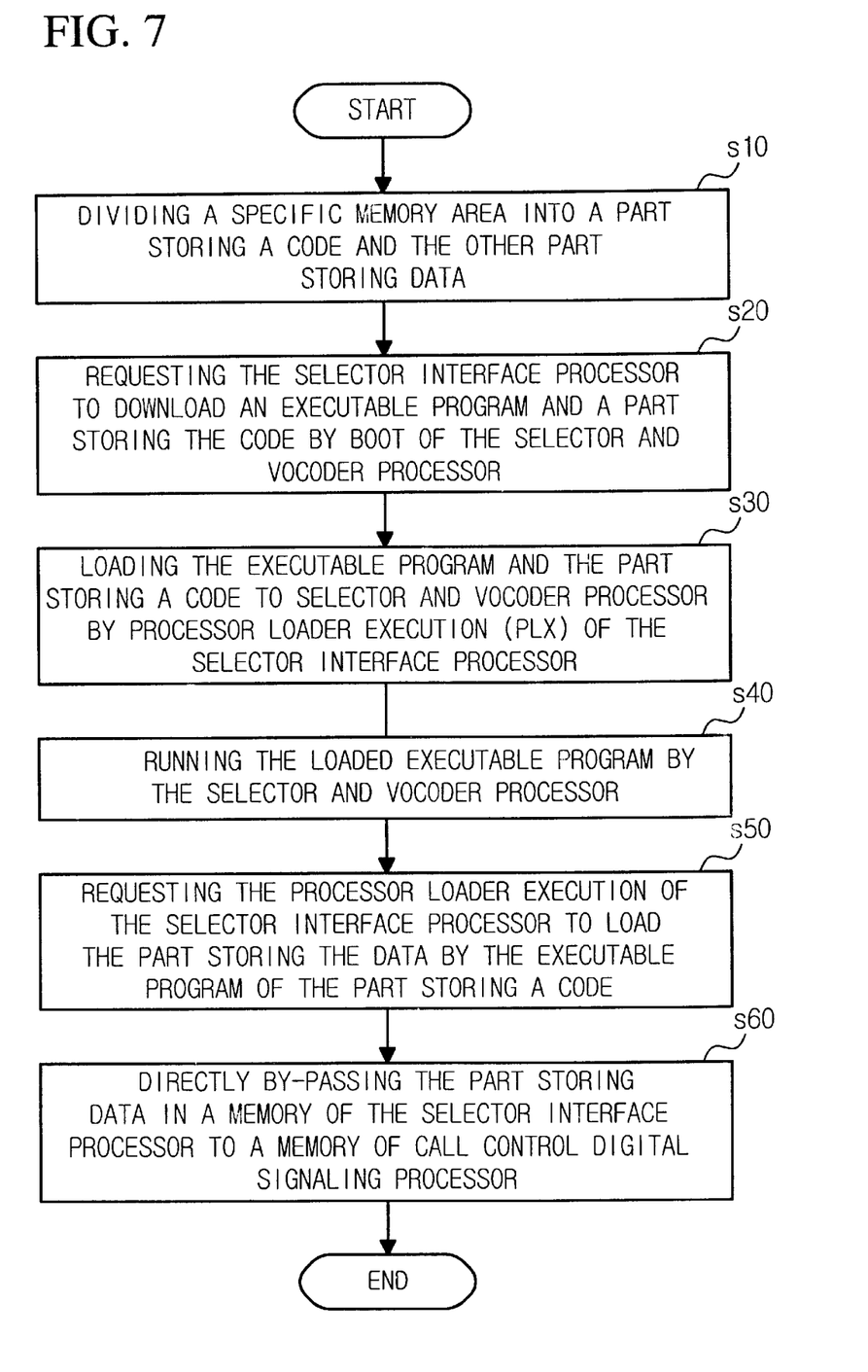
FIG. 7 is a flowchart of a method for downloading data to add a function to a vocoder in a code division multiple access (CDMA) cellular system according to the present invention.

FIG. 7 is a flowchart of a method for downloading data to add a function to a vocoder in a code division multiple access (CDMA) cellular system according to the present invention. The method includes the step of dividing a specific memory area into a code storing part including an executable program and a data storing part (step 710). The SIP is requested to download the code storing part including the executable program by BOOT of the SVP (step 720). The code storing part including the executable program is loaded to the SVP by the PLX of the SIP (step 730). The loaded executable program is run by the SVP (step 740). The PLX of the SIP is requested to load the data storing part by the executable program of the code storing part (step 750). The data storing part is directly loaded to a memory of the CDSP so as to by-pass a memory of the SVP (step 760).

As stated above, in order to solve the problem of a lack of memory in the SVP due to the addition of the EVRC function, the present invention divides the CDSPX into a code part and a data part. The data part is by-passed to the lower processor (i.e., CDSP), as the data part is unnecessary for the SVP. That is, the area of TCOX being increased on account of EVRC takes the reserved area newly obtained as the memory area to the degree of CDSPX data dropped out, so consequently, it is possible to use the existing system as it is without the additional costs for expansion of memory so that it can reduce the economic loss.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for downloading data to add enhanced variable rate code (EVRC) functions to a vocoder in a base station controller (BSC) of a code division multiple access (CDMA) cellular system, the BSC comprising a plurality of voice digital signaling processors (VDSPs), a call control digital signaling processor (CDSP), a selector and vocoder processor (SVP) and a selector interface processor (SIP), the BSC connecting a base station transceiver subsystem (BTS) and a mobile switching center (MSC), each of the plurality of VDSPs controlling each of a plurality of vocoders for compressing a voice, the CDSP controlling the plurality of VDSPs, the SVP controlling the CDSP, the SIP controlling the SVP, said method comprising the steps of:

dividing a specific memory area into a code part and a data part for storing code and data, respectively;

requesting the SIP to download an executable program and the code stored in the code part by BOOT of the SVP;

loading the executable program and the code stored in the code part to the SVP by a processor loader execution (PLX) of the SIP;

running the loaded executable program by the SVP;

requesting the PLX of the SIP to load the data stored in the data part by the executable program; and loading the data stored in the data part directly to a memory of the CDSP so as to bypass a memory of the SVP.

2. The method of claim 1, wherein the specific memory area corresponds to an area for storing a call control digital signaling processor execution (CDSPX) block.

3. The method of claim 1, wherein a call control digital signaling processor execution (CDSPX) block is stored in the code part and a code execution (CODEX) block is stored in the data part.

4. The method of claim 1, wherein the execution program and the code comprise: a real time operating system (RMOS_SVP); a transcoding selector bank controller execution block (TCOX); an SVP maintenance management execution block (SMNX); and a call control digital signaling processor execution (CDSPX) block.

5. The method of claim 1, wherein the data stored in the data part is executable data.

6. The method of claim 1, wherein said step of running said loaded executable program by the SVP comprises the steps of:

running a real-time operating system (RMOS_SVP) by the SVP; and running application blocks by the RMOS_SVP.

7. The method of claim 1, wherein if the PLX receives a load-request from a lower processor, said method further comprises the steps of:

confirming an address and determining a processor type of the lower requesting processor;

downloading a counted value to the lower requesting processor by the PLX, the counted value being equal to a number of software blocks listed in a software block table of the PLX having a same processor type as that of the requesting processor; and requesting a sequential load from 0 (zero) to the counted value minus 1 (one) by the lower requesting processor and loading a corresponding block.

8. The method of claim 7, wherein the software blocks listed in the software block table having the same processor type as that of the requesting lower processor comprise a real-time operating system (RMOS_SVP), a Transcoding Selector Bank Controller Execution (TCOX), a SVP Maintenance Execution (SMNX), a Call Control Digital Signaling Processor Execution (CDSPX), and a Code Execution (CODEX), when the requesting lower processor is the SVP.

9. The method of claim 8, wherein if the CDSPX is run and requests a load from the PLX of the SIP, said method further comprises the steps of:

downloading a value of a loading sequence corresponding to a software block to be next loaded to the CDSPX; and directly loading the software block corresponding to the value of the loading sequence from the PLX to the CDSP by the CDSPX.

10. The method of claim 1, wherein the memory of the CDSP is static random-access memory (SRAM).

* * * * *